United States Patent [19]
Aliberti

[11] 3,928,494
[45] Dec. 23, 1975

[54] POLYBLEND OF TWO TYPES OF ABS GRAFT POLYMERS AND A COPOLYMER MATRIX

[75] Inventor: Vincent A. Aliberti, Wilbraham, Mass.

[73] Assignee: Monsanto Company, St. Louis, Mo.

[22] Filed: Apr. 22, 1974

[21] Appl. No.: 462,710

Related U.S. Application Data

[63] Continuation-in-part of Ser. No. 322,244, Jan. 9, 1973, abandoned.

[52] U.S. Cl............ 260/876 R; 260/45.95; 260/879; 260/880 R
[51] Int. Cl.².. C08L 9/02; C08L 9/06; C08L 51/06; C08L 55/02
[58] Field of Search .................... 260/876 R, 880 R

[56] References Cited
UNITED STATES PATENTS

| | | | |
|---|---|---|---|
| 3,509,238 | 4/1970 | Aubrey et al. ................. | 260/876 R |
| 3,511,895 | 5/1970 | Kydonieus et al. ............. | 260/876 R |
| 3,576,910 | 4/1971 | Jastrzebski ..................... | 260/876 R |
| 3,592,878 | 7/1971 | Kromolicki .................... | 260/880 R |
| 3,658,946 | 4/1972 | Bronstert et al. ............... | 260/876 R |
| 3,700,622 | 10/1972 | Terenzi .......................... | 260/876 R |

*Primary Examiner*—Murray Tillman
*Assistant Examiner*—Thurman K. Page
*Attorney, Agent, or Firm*—Joseph S. Nelson; Edward P. Grattan; James C. Logomasini

[57] ABSTRACT

A polyblend of the ABS-type having a matrix phase of a styrene/acrylonitrile type resin and two dispersed phases therein. One dispersed phase is a highly grafted alkadiene rubber, the other dispersed phase is a lowly grafted homopolybutadiene rubber which is agglomerated to particle sizes in the range from about 0.6 to 3.0 micron. The graft superstrate on both dispersed phases is formed by styrene and acrylonitrile type monomers. These polyblends display a combination of low temperature impact strength and room temperature tensile strength.

3 Claims, 3 Drawing Figures

POLYBLEND OF TWO TYPES OF ABS GRAFT POLYMERS AND A COPOLYMER MATRIX

This application is a continuation-in-part of our earlier filed application Ser. No. 322,244, filed Jan. 9, 1973, now abandoned.

BACKGROUND

For certain low temperature (e.g., about 0° to −60° F.) applications, ABS-type resins have heretofore suffered the severe disadvantage of being brittle when in a heat-fused molded or extruded form, such as, for example, the form of drain, waste and vent pipe. When efforts were made to formulate a mixture of ABS-type components, based on prior art teachings, which would not be brittle at low temperatures and which would otherwise have a good balance of physical properties, the product polyblends generally were unsatisfactory. Thus, if the brittleness was reduced at low temperatures (as shown by low temperature impact strength tests), the tendency was for one or more other necessary or desirable properties (such as tensile strength or gloss) in, for example, drain waste and vent pipe, to deteriorate to commercially unacceptably low levels.

The problem of finding a commercially useful low-temperature non-brittle ABS-type resin was rendered more difficult by the fact that such a resin should be made by emulsion polymerization routes owing to the cost saving features associated with such routes. A number of approaches to solving this problem were explored, but none indicated a promise of solution.

There has now been discovered, however, a polyblend of ABS-type resins which may be made by the emulsion route and which demonstrates good low-temperature tensile strength properties together with a good balance of other properties. In a heat-fused form, this polyblend comprises a matrix phase of a styrene/acrylonitrile type copolymer in which are distributed particles of two different types of grafted alkadiene rubber. One such type of graft rubber particle comprises relatively medium sized diene rubber particles rather highly grafted with styrene and acrylonitrile type monomers; the other type comprises relatively large sized diene rubber type particles grafted rather lowly with styrene and acrylonitrile type monomers. The rubber particles in this last type are in fact composed of stable agglomerates of relatively small rubber particles. Both such types of grafted diene rubber particles are readily produced by emulsion polymerization technology. The matrix phase can be produced by emulsion, suspension or mass routes, or combinations thereof.

It happens that ABS-type polyblends having incorporated within a styrene/acrylonitrile type matrix phase two different graft copolymers, one such graft copolymer being relatively lightly grafted and the other being relatively highly grafted, have heretofore been taught by Aubrey and Jastrzebski in U.S. Pat. No. 3,509,238. While these Aubrey et. al. blends do in fact display high impact resistance, good gloss, and good tensile properties under ambient temperature conditions, all as taught in this patent, it has now been determined that these Aubrey et. al. polyblends do not possess such a correspondingly good balance of properties at low temperatures, so that these polyblends are generally not useful in such applications as drain, waste and vent pipe.

The polyblends of the present invention are distinct from, and are an unexpected improvement over, the polyblends of Aubrey et. al. in that while the matrix and the relatively highly grafted rubber component used in the present polyblends are comparable to those used by Aubrey et. al., the relatively lowly grafted rubber component used in the present polyblends is completely different from, and not in any way suggested by, Aubrey et. al. The relatively lowly grafted rubber component used in the present polyblends is much larger than the corresponding component used by Aubrey et. al. Thus, the lowly grafted rubber particles component of Aubrey et. al. has a particle size in the range of from about 0.03 to 0.6 micron (based on number average) whereas the lowly grafted rubber particle component used in the polyblends of the present invention has a particle size in the range of from about 0.6 to 3.0 micron (also based on number average) with at least half of such particles used in the present polyblends being above about 0.8 micron in size. While Aubrey et. al. require both lowly and highly grafted classes of grafted rubber particles to be in the same size range (of 0.03 to 0.6 micron, as just indicated), only the relatively highly grafted such component in the present polyblends is in this (smaller) size range.

While Aubrey et. al. broadly describe the diene rubber used as the substrate in their lowly grafted particles, only one type of diene rubber is believed suitable for use in making polyblends of the present invention and this type is homopolymers of conjugated alkadiene monomers, especially butadiene, because no other diene rubbers are believed to agglomerate to particle sizes after grafting in the 0.6 to 3.0 micron size range, as indicated. Furthermore, such agglomeration results only with lowly (lightly) grafting of such rubbers, as taught herein. Nothing in Aubrey et. al. teaches such grafted rubbers or the properties thereof.

The polyblends of the present invention display a combination of low temperature impact strength and room temperature tensile strength which is far better than the corresponding combination of strength displayed by a styrene/acrylonitrile matrix containing only one of the two such grafted rubber components individually and in equivalent amounts. Furthermore, the polyblends of the present invention display such a combination of strength properties to a far greater extent than is displayed by the corresponding polyblends taught by U.S. Pat. No. 3,509,238. Consequently, the polyblends of the present invention are considered to be a synergistically effective combination of a particular lowly and a particular highly grafted ABS-type rubber component in a styrene/acrylonitrile type matrix. Nothing in the prior art teaches or suggests such a synergistic combination.

SUMMARY

The present invention relates to polyblends adapted to display a combination of low temperature impact strength and room temperature tensile strength. The polyblends also display, when heat-fused, relatively high surface gloss. These polyblends contain from about 70 to 90 weight percent total styrene/acrylonitrile. They comprise from about 40 to 89 weight percent of styrene/acrylonitrile copolymer as matrix with the balance up to 100 weight per cent thereof being a mixture of two classes of graft copolymer particles, each class being dispersed throughout the styrene/acrylonitrile which, when the polyblends are in a heatfused form serves as the matrix phase. The styrene/acrylonitrile has a weight average molecular weight of from about 75,000 to 300,000, and the weight ratio of styrene to acrylonitrile in such copolymer ranges from about 95:5 to 30:70. The weight ratio of the first graft copolymer to the second graft copolymer in a polyblend ranges from about 85:15 to 5:95.

The first class of graft copolymer particles is characterized by having:

1. a number average particle size of from about 0.03 to 0.6 micron,
2. a substrate elastomer comprising a copolymer of from about 70 to 98 weight per cent of a conjugated alkadiene with correspondingly from about 30 to 2 weight per cent based on total substrate elastomer weight of at least one compound selected from the group consisting of styrene and acrylonitrile, preferably acrylonitrile.
3. a superstrate grafted to said substrate elastomer and comprising polymerized styrene and acrylonitrile in the weight ratio of from about 95:5 to 30:70, and
4. there being from about 30 to 100 parts by weight of grafted superstrate for each 100 parts by weight of said substrate elastomer.

The second class of graft copolymer particles is characterized by having:

1. a number average particle size of from about 0.6 to 3.0 micron, and at least half of such particles have a particle size above about 0.8 micron,
2. a substrate elastomer comprising homopolyalkadiene, preferably homopolybutadiene,
3. a superstrate grafted to said substrate elastomer and comprising polymerized styrene and acrylonitrile in the weight ratio of from about 95:5 to 30:70,
4. there being from about 3 to 30 parts by weight of grafted superstrate for each 100 parts by weight of said substrate elastomer, and,
5. said second graft copolymer particles being comprised of agglomerated grafted subparticles at least 90 weight per cent of which have particle sizes in the range of from about 0.05 to 0.15 micron.

This polyblend has a total elastomer content (ungrafted basis) ranging from about 10 to 30 weight per cent (based on total polyblend).

FIGURE DESCRIPTION

The invention is better illustrated by reference to the appended drawings wherein:

FIG. 3 is an artist's drawing of a micrograph of a heat-fused polyblend of the present invention.

Figure 1:
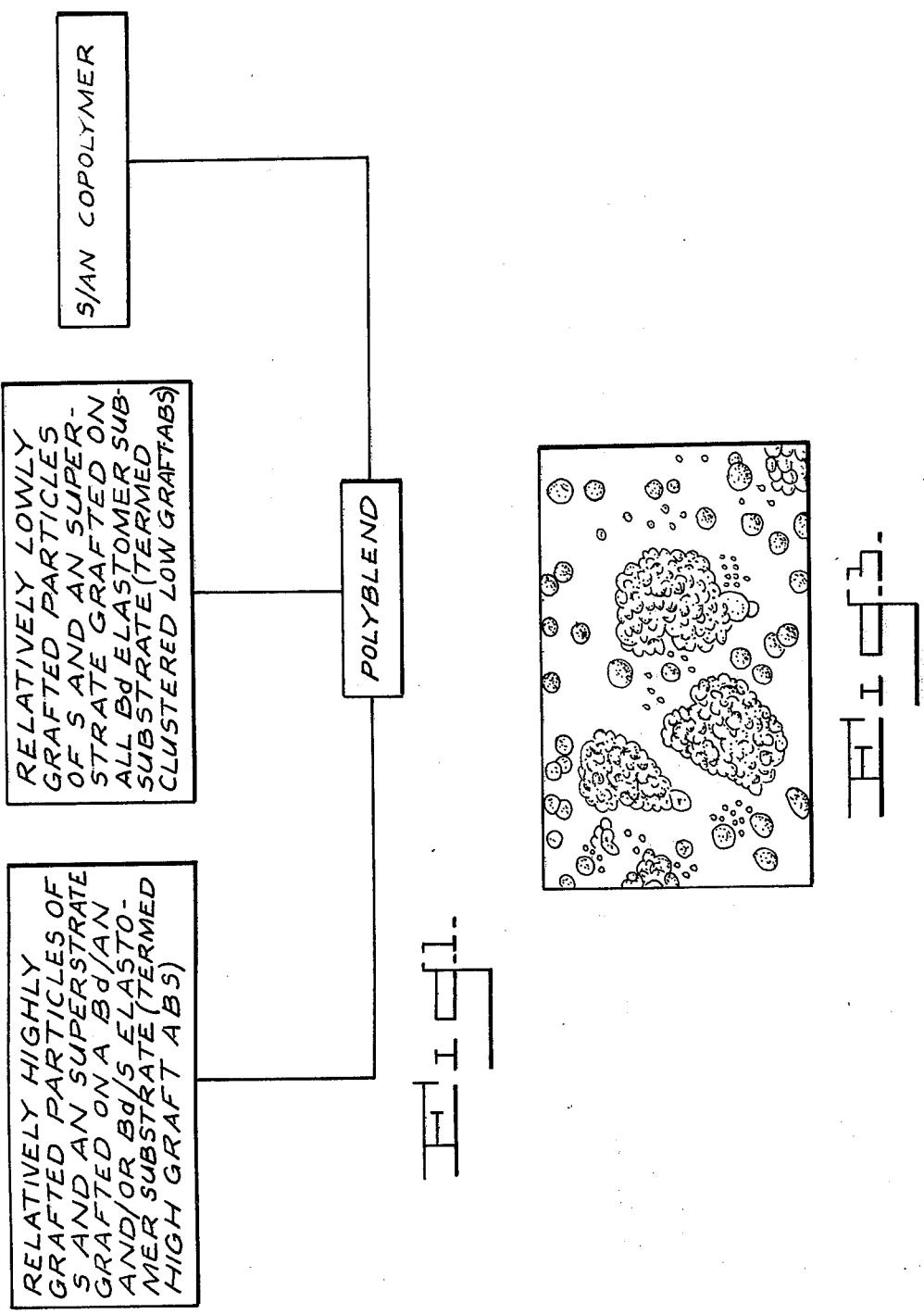
FIG. 1 is a simplified flow sheet illustrating preparation of the polyblends of this invention.

FIG. 1 is believed to be self-explanatory. In general, one prepares the first and the second graft copolymers separately and then blends same with added styrene/acrylonitrile copolymer as necessary or desirable to make a polyblend of this invention. Conventional procedures are used.

Methods for the preparation of first and second graft copolymer are well known to the art generally; sec, for example, the Aubrey et. al. U.S. Pat. No. 3,509,238.

Figure 2:
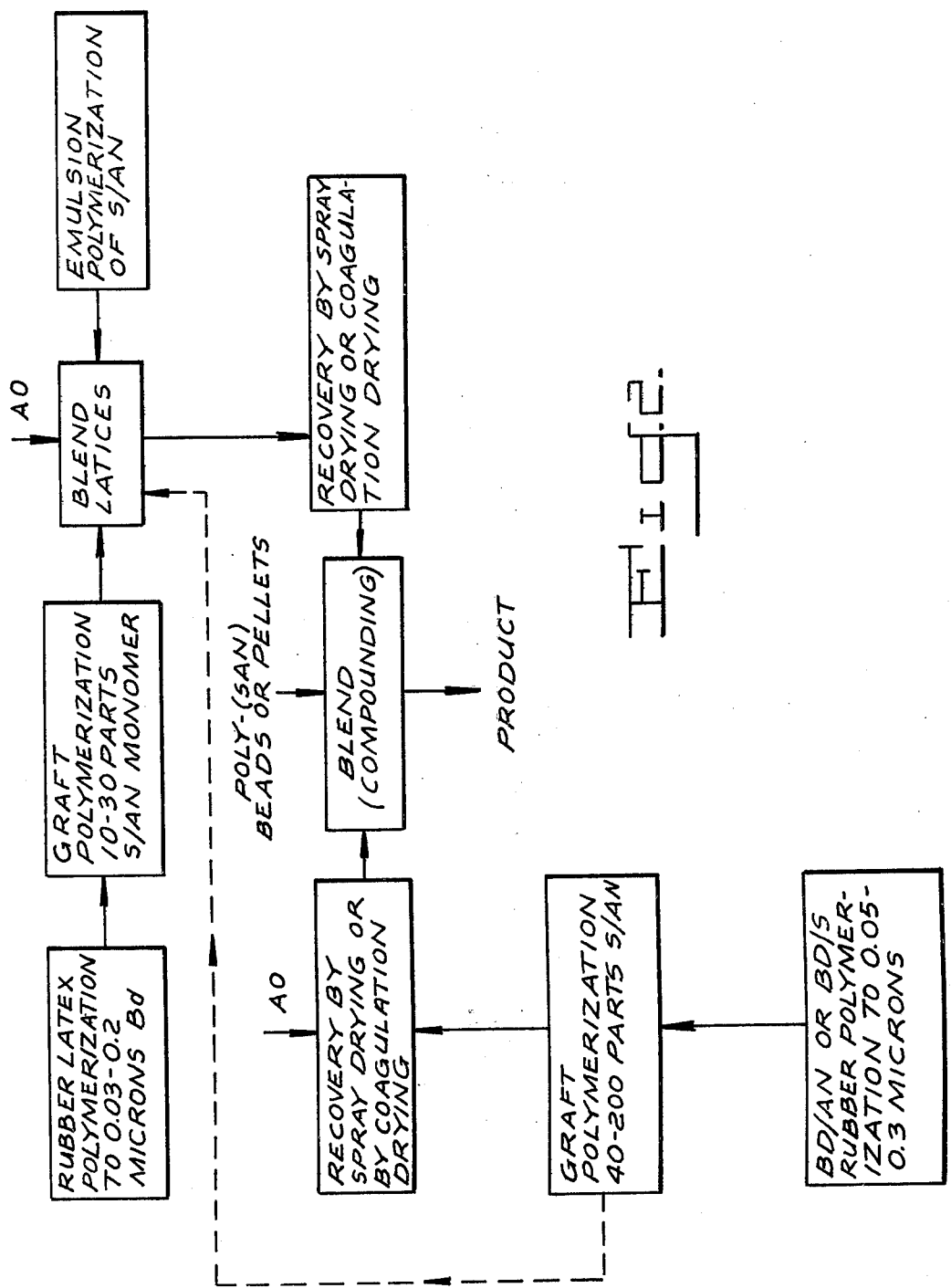
FIG. 2 is a flow sheet illustrating in greater detail one preferred procedure for preparing the polyblends of the present invention.

In FIG. 2 is presented a flow sheet illustrating one procedure suitable for the preparation on a commercial scale of polyblends of the present invention. Micron size ranges shown are weight averages. The designation "A.O." indicates antioxidant. The dotted line arrows indicate an optional procedure. Briefly, butadiene (Bd.) is first homopolymerized in emulsion and then graft polymerized in emulsion with styrene and acrylonitrile monomers. Independently, styrene and acrylonitrile are emulsion copolymerized. This copolymer emulsion and the graft copolymer emulsion are then blended with an antioxidant and the solids of the resulting mixed latex recovered by spray drying or coagulation followed by a drying operation.

Independently, a butadiene copolymer elastomer with styrene or acrylonitrile is emulsion polymerized and then grafted in emulsion with styrene and acrylonitrile monomers. Recovery with antioxidant by spray drying, or by coagulation followed by a drying operation, then occurs. A product polyblend is finally made by blending this last grafted product with the blend earlier prepared. Added styrene/acrylonitrile copolymer in bead or pellet form may be added in the product blend.

In FIG. 3 is illustrated the usual appearance of a heatfused section of a polyblend of this invention. The smaller particles are those of the highly grafted diene copolymer; the larger particles develop when an emulsion of the grafted homopolybutadiene particles is coagulated and dried, or simply spray dried directly.

Other conjugated alkadiene besides butadiene may be employed, such as isoprene, and the like.

The composition of a matrix phase preferably approximates the chemical composition of the superstrate of the graft copolymers so as to obtain matching of chemical preperties.

THE MATRIX PHASE

Those skilled in the art will appreciate that a matrix composition may be prepared by any conventional means known to those skilled in the art, including, for example, emulsion, suspension, and/or mass polymerization. Those skilled in the art will appreciate that in a polyblend product of this invention, the matrix phase typically may comprise a mixture of different S/AN type copolymers derived from several sources, including ungrafted superstrate material from each of the graft components as well as added matrix copolymer.

THE DISPERSED PHASE

The dispersed phase graft copolymers may be prepared by any conventional means known to those skilled in the art. However, for purposes of the practice of the present invention, it is greatly preferred to produce a dispersed phase by polymerizing the superstrate monomers in the presence of a preformed rubber substrate. In such a prepared graft polymer system, it is generally not possible to extract the rubber from the polymerized mass with the usual rubber solvents, but some of the starting rubber polymer may not be in actual chemical combination with the superstrate. Also, since 100 per cent grafting effeciency of superstrate monomers to such rubber substrate normally is approached only at weight ratios of monomers to substrate of below about 0.3:1, at least a portion of the monomers polymerized in the presence of the preformed rubber will not chemically combine therewith so as to provide the graft copolymer product. This portion may be increased or decreased depending upon the ratio of monomers to rubber, the particular monomer starting formulation, the nature of the rubber, and the conditions of polymerization. Hence, a dispersed phase typically contains some amount of (relative to the amount of the first composition described above) a second copolymer of monovinylidene aromatic monomer and alkene nitrile monomer. Any of the usual graft polymerization processes may be used to accomplish polymerization of the ungrafted superstrate monomers to the substrate, including mass, suspension, and emulsion, or a combination thereof. Such techniques are generally well known to those skilled in the art.

Although the rubber may contain up to about 2 per cent of a cross-linking agent, based on the weight of the rubber-forming monomer or monomers, cross-linking may present problems in dissolving the rubber in the monomers for the subsequent graft polymerization reaction. In addition, excessive cross-linking can result in loss of the rubbery characteristics. The cross-linking agent can be any of the agents conventionally employed for cross-linking diene rubbers, e.g., divinyl benzene, diallyl maleate, diallyl fumarate, diallyl adipate, allyl acrylate, allyl methacrylate, diacrylates, and dimethacrylates of polyhydric alcohols, e.g., ethylene glycol dimethacrylate, etc.

Of the various techniques customarily employed for the polymerizing of rubber monomers, including mass, suspension, and emulsion polymerization, emulsion polymerization is preferred since such will provide the particle size distribution most preferred for use in the present invention. Furthermore, emulsion polymerization of rubber monomers produces a latex which is useful as a base for subsequent emulsion polymerization of the graft copolymer in the preparation of a dispersed phase.

The graft copolymers of a dispersed phase may be prepared by polymerizing superstrate monomers in the presence of the preformed rubber substrate, generally in accordance with conventional graft polymerization techniques. Although suspension and mass polymerization techniques may be employed, the preferred processes use an emulsion technique to obtain the particle size of not more than about 0.6 microns for the graft copolymer which is preferred for use in the practice of the present invention. In such graft polymerization a preformed rubber substrate generally is dissolved or dispersed in the monomers and this admixture is polymerized to combine chemically or graft a portion of the superstrate monomers upon the rubber substrate. Depending upon the ratio of monomers to rubber substrate and polymerization conditions, it is possible to produce both the desired degree of grafting of the superstrate monomers onto the rubber substrate and the polymerization of ungrafted matrix copolymer to provide a portion of the matrix at the same time. The ratio of monomers to rubber charged to the graft polymerization reaction zone is the primary determinant of the superstrate:substrate ratio of the resultant graft copolymer, although conditions of polymerization, rubber chemistry and particle size, rates of monomer addition, chain transfer agents, etc., may also exert an effect.

The catalyst is generally included within the range of from about 0.001 to 2.0 weight per cent, and preferably from about 0.005 to 1.0 weight per cent of the polymerizable material, the exact amount depending upon the monomers and the desired polymerization cycle.

As is well known, it is often desirable to incorporate molecular weight regulators such as mercaptans, halides and terpenes in relatively small percentages by weight, on the order of from about 0.001 to 2.5 per cent by weight of the polymerizable material. In addition, it may be desirable to include relatively small amounts of antioxidants or stabilizers, such as the conventional alkylated phenols, although these may be added during or after polymerization.

In the emulsion polymerization grafting process, the monomers and the rubber substrate are emulsified in water by use of suitable emulsifying agents, such as fatty acid soaps, alkali metal or ammonium soaps of high molecular weight, alkyl or alkaryl sulfates and sulfonates, mineral acid salts of long chain aliphatic amines, etc. Emulsifying agents which have proven particularly advantageous are ammonium oleate, sodium palmitate, sodium stearate, and other sodium soaps. Generally, the emulsifying agent is provided in amounts of from about 0.1 to 15 parts by weight per 100 parts by weight of the monomers, and water is provided in an amount of from about 1 to 4 parts per part of monomers, and even in larger ratios where greater dilution is desirable.

If desired, an aqueous latex formed in the emulsion polymerization of the rubber substrate may provide the aqueous medium onto which the monomers are grafted, with or without the addition of further emulsifying agents, water, and the like. However, the rubber may be dissolved in the monomers, and the mixture reemulsified, or a latex thereof may be separately prepared. Various water soluble free radical polymerization initiators are conventionally used for emulsion polymerization of the rubber monomer, including conventional peroxy and azo-catalysts, and the resulting latex may be used as the aqueous medium in which the graft copolymer monomers are admixed. In this manner the catalyst for the rubber polymerization may function in whole or part as the catalyst for the graft polymerization. However, additional catalysts may be added at the time of graft polymerization.

Typical emulsion polymerization conditions involve temperatures in the range of from about 20° to 100° C. with agitation, and preferably an inert atmosphere. Pressures of from about 1 to 100 pounds per square inch may be employed, and monomers and/or additional catalysts may be added incrementally or continuously over a portion of the reaction cycle. Polymerization is preferably continued until substantially all, that is, more than 90 per cent, of the monomers have polymerized. The remaining monomers and other volatile components are then distilled away from the latex, preferably, which is then dewatered, washed and dried.

Particle size of the emulsion latex graft particles may be varied by seeding, emulsifying agent concentration, agitation, rubber size variation through agglomeration prior to grafting, coagulation techniques, etc.

The particle size of the rubber has an effect upon the optimum grafting level for a graft copolymer. For example, a given weight percentage of smaller size rubber particles will provide considerably higher surface area for grafting than the equivalent weight of a larger size rubber particle. Accordingly, the density of grafting can be varied depending upon the size of the rubber particle. Generally the smaller particles will tolerate a higher superstrate/substrate ratio than the larger size particles.

The particle size of the rubber graft copolymer has a significant effect upon the gloss and tensile properties of the product produced by the processes of this invention. Typically, the particle size of the graft copolymers used in the practice of the present invention may be varied in an emulsion before agglomeration from as little as about 0.03 microns to as much as about 0.6 microns, depending upon the ultimate properties desired for a given product.

For purposes of determining weight average particle size, one can prepare a dispersion of the graft copolymer particles and make a photo-micrograph thereof. The size of approximately 200 to 1,000 particles is then measured and an average taken thereof, so as to obtain the average particle size based upon a number average or a weight average. Alternatively, other techniques of measurement may be employed, including light scattering techniques, so long as a reasonably close relationship is established between actual size and the techniques employed.

Although a starting rubber may be cross-linked, this may present problems from the standpoint of dissolving or dispersing the rubber for a suspension polymerization process. However, for emulsion polymerization processes the rubber desirably has a significant degree of cross-linking. With respect to the graft copolymers, however, at least some degree of cross-linking is inherent during the graft polymerization processes, and this desirably may be augmented through the addition of cross-linking agents or control of the polymerization conditions.

To prepare a dispersed phase, it is preferred as a first step to mix from about 15 to 99 parts by weight (in terms of solid content) of an alkadiene type rubbery polymer latex with, correspondingly, from about 3 to 200 parts by weight of at least one monomer of the monovinylidene aromatic type or the alkene nitrile type, which is graft polymerizable on said rubbery polymer, and then the resulting mixture is subjected to an emulsion graft polymerization. Thereafter the product is separated and dried before blending to make a polyblend of this invention.

EMBODIMENTS

The following specific examples are exemplary of the efficacy of the present invention. All parts are parts by weight unless otherwise indicated.

EXAMPLE 1

PART A

To 100 parts of a latex homopolybutadiene containing 40 per cent rubber solids and approximately 3.0 parts of rubber reserve soap as an emulsifier are added 30 parts water and 15 parts of a 2.0 per cent aqueous solution of potassium persulfate. The emulsion is heated to 70° C. with stirring and then there is added thereto over a period of about 1 hour, 21 parts styrene and 9 parts acrylonitrile. The emulsion is held at temperature for one hour thereafter with stirring, cooled, coagulated, and the recovered polymer is then washed and dried and is lightly grafted.

The recovered polymer contains graft copolymer particles of from about 0.6 to 1.5 micron, and at least half of such particles have a particle size above about 0.8 micron. The superstrate has a weight ratio of styrene to acrylonitrile of about 68.32 to 72:28. There are about 21 parts by weight of grafted superstrate for each 100 parts by weight of substrate homopolybutadiene. These graft copolymer particles are comprised of subparticles at least 90 weight per cent of which have particle sizes in the range of from about 0.06 to 0.1 micron. The amount of ungrafted styrene/acrylonitrile copolymer admixed with such graft copolymer particles is about 7 to 8 weight per cent (based on total composition weight), and such copolymer has a number average molecular weight of about 40,000 and a weight ratio of styrene to acrylonitrile of about 68:32 to 72:28.

PART B

Example 1, Part B, lines 35-50 of Aubrey et. al., U.S. Patent 3,509,238 is followed to produce highly grafted copolymer particles.

The recovered polymer contains graft copolymer particles of from about 0.12 to 0.16 micron. The superstrate grafted to the substrate elastomer comprises polymerized styrene and acrylonitrile in the weight ratio of about 64:36 to 68:32. There are about 100 parts by weight of grafted superstrate for each 100 parts by weight of substrate elastomer. The amount of ungrafted styrene/acrylonitrile copolymer admixed with such graft copolymer particles is about 21 weight per cent (based on total composition weight), and such copolymer has a number average molecular weight of about 35,000 and a weight ratio of styrene to acrylonitrile of about 64:36 to 68:32.

PART C

Emulsion polymerized styrene/acrylonitrile copolymer is prepared conventionally. This copolymer has a weight average molecular weight of about 200,000 and a weight ratio of styrene to acrylonitrile of about 68:32 to 72:28.

PART D

A total of 13 parts of Part A product, 38.1 parts of Part B product, and 48.9 parts of Part C product are blended together to produce a polyblend of this invention which comprises (on a 100 weight per cent total polyblend basis) about 57.9 weight per cent of a matrix phase comprising copolymer of styrene and acrylonitrile having a molecular weight average of about 172,000 and a weight ratio of styrene to acrylonitrile in the range of from about 64:36 to 72:28, and about 42.1 weight per cent of a mixture of a first graft copolymer (of Part B above) and a second graft copolymer (of Part A above). The first and second such graft copolymers are dispersed throughout the styrene/acrylonitrile matrix phase when this polyblend is heatfused. The weight ratio of first graft copolymer to second graft copolymer in this polyblend ranges from about 28:72 to 30:70. This blend has a total rubber content (ungrafted basis) of about 25 weight per cent (total blend basis).

This polyblend is found to produce when heat-fused and extruded excellent drain, waste and vent pipe. This polyblend displays a low temperature impact strength of about 3.5 Izod at −40° F. and a room temperature tensile strength of about 5200 psi. This polyblend has excellent gloss characteristics.

EXAMPLES 2 – 4

The procedure of Example 1 is generally repeated to prepare additional polyblends of this invention and such polyblends are evaluated. Results are summarized in the attached Table:

TABLE

| | Ex. 2 | Ex. 3 | Ex. 4 |
|---|---|---|---|
| MATRIX PHASE | | | |
| Weight Average Molecular Weight | 250,000 | 210,000 | 210,000 |
| Weight Ratio Styrene to Acrylonitrile | 72/28/ | 70/30 | 70/30 |
| FIRST GRAFT COPOLYMER | | | |
| Number Average Particle Size | 0.16 | 0.15 | 0.17 |
| Per cent Butadiene (weight) | 93 | 93 | 93 |
| Per cent Styrene or Acrylonitrile | 7 | 7 | 7 |
| Superstrate S:AN - weight ratio (grafted) | 70:30 | 70:30 | 70:30 |
| Parts Graft per 100 Parts Substrate (weight) | 45 | 55 | 60 |
| SECOND GRAFT COPOLYMER | | | |
| Number Average Particle Size | 1.0 | 1.2 | 0.8 |
| Superstrate S:AN - weight ratio (grafted) | 70:30 | 70:30 | 70:30 |
| Parts Graft per 100 Parts Substrate (weight) | 14 | 9 | 24 |
| Sub-particle Size Before Agglomeration | .07 | .08 | .06 |
| Weight Ratio of Rubber from First Graft Copolymer to Second Graft Copolymer | 55:45 | 55:45 | 50:50 |
| TOTAL COMPOSITION (100 Weight Per Cent Basis) | | | |
| Styrene/Acrylonitrile | 64.6 | 67.7 | 65.3 |
| Rubber (ungrafted basis) | 27 | 24 | 24 |
| Total Weight - First and Second Graft Copolymers | 35.4 | 32.3 | 34.7 |
| IMPACT STRENGTH (Izod) | | | |
| 73°F. | 9.1 | 8.9 | 9.2 |
| −40°F. | 4.7 | 3.1 | 5.0 |
| TENSILE STRENGTH | | | |
| 73°F. | 5,000 | 5,600 | 5,300 |

What is claimed is:

1. An improved polyblend adapted to display a combination of low temperature impact strength and room temperature tensile strength comprising (on a 100 weight percent total polyblend basis) from about 40 to 89 weight percent of a matrix phase comprising copolymer of styrene and acrylonitrile having a weight average molecular weight of from about 75,000 to 300,000 and a weight ratio of styrene to acrylonitrile of from about 95:5 to 30:70, with the balance up to 100 weight percent thereof being a mixture of a first graft copolymer with a second graft copolymer, said graft copolymers being dispersed throughout said styrene/acrylonitrile copolymer when said polyblend is in a heat-fused form, the weight ratio of said first graft copolymer to said second graft copolymer in said polyblend ranging from about 85:15 to 5:95, said polyblend having a total elastomer content (ungrafted basis) ranging from about 10 to 30 weight percent (based on total polyblend), A. said first graft copolymer particles being characterized by having
  1. a number average particle size of from about 0.03 to 0.6 micron,
  2. a substrate elastomer comprising a copolymer of from about 70 to 98 weight percent of a conjugated alkadiene with, correspondingly, from about 30 to 2 weight percent based on total substrate elastomer weight of at least one compound selected from the group consisting of styrene and acrylonitrile,
  3. a superstrate grafted to said substrate elastomer and comprising polymerized styrene and acrylonitrile in the weight ratio of from about 95:5 to 30:70,
  4. there being from about 30 to 100 parts by weight of grafted superstrate for each 100 parts by weight of said substrate elastomer, wherein B. said second grafted copolymer particles being characterized by having a superstrate grafted to said substrate elastomer and comprising polymerized styrene and acrylonitrile in the weight ratio of from about 95:5 to 30:70 and from about 3 to 30 parts by weight of grafted superstrate for each 100 parts by weight of said substrate elastomer, wherein the improvement comprises said second grafted copolymer particles having:
  1. a number average particle size of from about 0.6 to 3.0 microns, and at least half of such particles have a particle size above about 0.8 micron,
  2. a substrate elastomer comprising homopolyalkadiene as the sole substrate, and
  3. said second graft copolymer particles being comprised of agglomerated grafted subparticles at least 90 weight percent of which have particle sizes in the range of from about 0.05 to 0.15 micron before agglomeration.

2. A polyblend of claim 1 where in the substrate elastomer of said first graft copolymer is butadiene/acrylonitrile copolymer.

3. The polyblend of claim 1 wherein said homopolyakladiene is homopolybutadiene.

* * * * *